US000001261H

United States Statutory Invention Registration [19]

[11] Reg. Number: H1261

[43] Published: Dec. 7, 1993

Gibson et al.

[54] ON-LINE CONSOLIDATION OF FILAMENT WOUND THERMOPLASTIC PARTS

[76] Inventors: Baylor D. Gibson, 503 Cottonfield Cir., Waxhaw, N.C. 28173-9387; Clinton D. Felton, 3700 Barclay Downs Dr., Charlotte, N.C. 28209

[21] Appl. No.: 883,755

[22] Filed: May 15, 1992

[51] Int. Cl.[5] ..... B31C 1/00; B65H 81/00

[52] U.S. Cl. ..... 156/169; 156/173; 156/175; 156/425; 220/414

[58] Field of Search ..... 156/166, 169, 173, 175, 156/161, 425; 220/414

[56] References Cited

U.S. PATENT DOCUMENTS

| | | | |
|---|---|---|---|
| 3,148,102 | 9/1964 | Eakins et al. | 156/161 |
| 3,770,539 | 11/1973 | Bullock | 156/161 X |
| 4,010,054 | 3/1977 | Bradt | 156/173 |
| 4,540,737 | 9/1985 | Wissbrun et al. . | |
| 4,799,985 | 1/1989 | McMahon et al. . | |
| 4,997,503 | 3/1991 | Bohannan et al. | 156/173 X |
| 5,039,368 | 8/1991 | Gunyuzlu | 156/175 |
| 5,123,990 | 6/1992 | Roach | 156/173 X |
| 5,150,812 | 9/1992 | Adams | 220/414 |
| 5,160,568 | 11/1992 | Gruber | 156/425 X |

FOREIGN PATENT DOCUMENTS

| | | | |
|---|---|---|---|
| 0265915 | 5/1988 | European Pat. Off. | 156/169 |

OTHER PUBLICATIONS

Hollingsworth, R. D. et al, "Filament Wound Thermoplastic Matrix Pressure Vessels" 32nd International SAMPE Symposium, Apr. 6-9, 1987, pp. 662-669.

"Composite Cylinders for GNC," 34th Annual Conference Reinforced Plastics/Composites Inst., Society of the Plastics Institute, Inc., Feb. 16-20, 1981, pp. 1-8.

Morris, E. E., "Advances in Fiber/Metal Pressure Vessel Technology," American Institute of Aeronautics and Astronautics, Inc., 1989, pp. 1-9.

Morris, V. L., "Advanced Composite Structures for Cryogenic Applications," 34th International SAMPE Symposium, May 8-11, 1989, pp. 1867-1876.

Lynn, V., "What is Filament Winding?" Aerospace Design and Components, Sep. 1986, pp. 32-37.

Youngs, A. "Advanced Composite Thermoplastics:A new Structural Material," Society of Plastics Engineers, 43rd Annual Technical Conference Proceedings, Apr. 20-May 2, 1985, pp. 1181-1183.

*Primary Examiner*—Donald P. Walsh
*Assistant Examiner*—Anthony R. Chi

[57] ABSTRACT

A filament winding process for a melt-processable, thermoplastic matrix material, and a reinforcing fiber. The process is heat and pressure intensive. An on-line consolidation is provided.

8 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

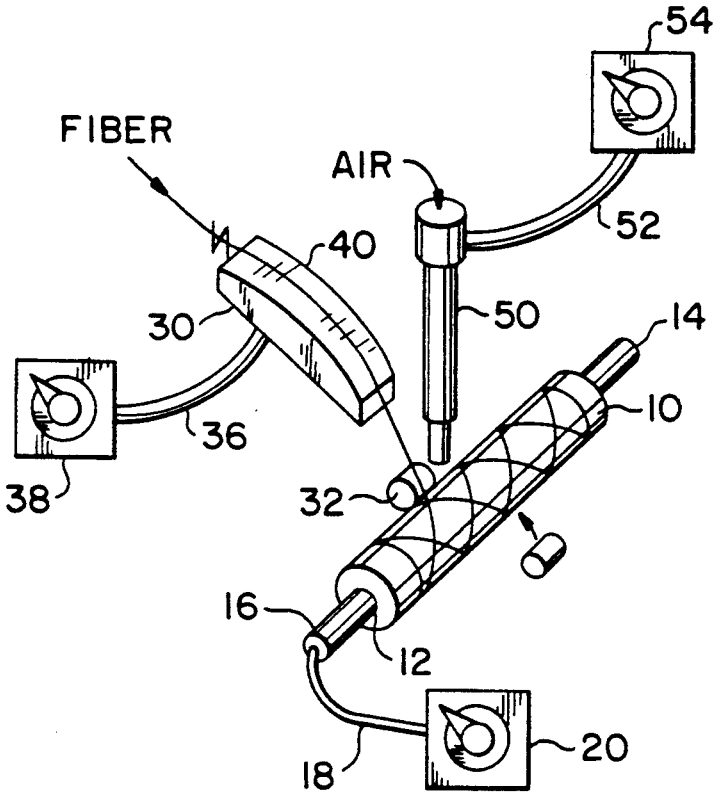
54
FIBER
AIR
52
40
50
30
14
10
36
38
32
16
12
20
18

ON-LINE CONSOLIDATION OF FILAMENT WOUND THERMOPLASTIC PARTS

FIELD OF THE INVENTION

This invention relates to filament winding, particularly to filament winding of melt-processable, thermoplastic materials.

BACKGROUND OF THE INVENTION

Filament wound parts or structures include containers such as tanks, pressure vessels, cylinders and bottles, and conduits such as piping and tubing, which may be used for pressurized or compressed gases and cryogenic gases. Containers for the storage or transportation of such gases may be made with a metal inner liner and a filament wound, structural overwrap made of a composite material formed of high strength, reinforcing fiber within a matrix resin. Further information about fiber wrapped structures may be found in "Composite Cylinders for CNG", 36th Annual Conference, Reinforced Plastics/Composites Institute, The Society of the Plastics Industry, Inc., Feb. 16–20, 1981, Session 22–E, p. 1–8; Morris, E. E., "Advances in Composite Fiber/Metal Pressure Vessel Technology", American Institute of Aeronautics and Astronautics, Inc., 1989, p. 1–9; Morris, V. L., "Advanced Composite Structures for Cryogenic Applications", 34th International SAMPE Symposium, May 8–11, 1989, p. 1867–1876; and Lynn, V., "What is filament winding?", *Aerospace Design and Components,* September 1986, p. 32–37.

When making filament wound parts or structures, continuous fiber is conventionally wound onto a mandrel in predetermined geometric patterns such as polar, helical or hoop windings, using computerized winding equipment. Creels hold the fiber and it is fed under tension. The mandrel may rotate or be passive. The orientation and thickness of the winding may be selected to match the direction and magnitude of loads in the final part or structure.

As described in U.S. Pat. No. 5,150,812, after the fiber is wound, it may be fused by vacuum bagging and consolidating in an autoclave or directly on the forming mandrel by the application of heat. The mandrel may be thereafter removed.

As exemplified by "Filament Wound Thermoplastic Matrix Pressure Vessels", 32nd International SAMPE Symposium, Apr. 6–9, 1987, p. 662–669, a thermoplastic matrix carbon fiber prepreg may be filament wound using a heat source and a compaction technique to melt the resin and consolidate the plies while winding. As illustrated by other work, when manufacturing parts from a prepreg made from a reinforcing fiber and a thermoplastic resin, heat may be applied from the mandrel to prepreg wound onto the mandrel, and may also be externally applied.

High strength, reinforcing or structural fiber useful in filament winding, includes fiberglass which may be E glass or S glass, and aramid, boron and carbon fiber. The matrix resins are thermosetting and thermoplastic resins. However, thermosetting resins, especially epoxy resins, are the most popular. Conventional filament winding works particularly well with a thermoset matrix material.

Unlike flexible chain, thermoplastic polymers such as polyester or polypropylene, thermoplastic resins having a high melting point, are difficult to process by conventional filament winding techniques. Processing difficulties are accentuated when the filament winding also involves a structural fiber.

Therefore, there is a need for an improved filament winding process for forming a consolidated, filament wound composite from reinforcing fiber and a thermoplastic matrix material having a high melting point.

SUMMARY OF THE INVENTION

In the present invention, a melt-processable, shear-sensitive, thermoplastic material is used. Thus, an improved filament winding process in accordance with the invention, includes winding continuous filament in the form of reinforcing fiber and a suitable melt-processable, thermoplastic matrix material onto a mandrel to provide a composite material. The thermoplastic matrix material beneficially is heated to a thixotropic molten state during the winding process, and flows easily in the molten state upon the application of pressure.

During the filament winding, heat is applied to an internal surface of the wound filament, and heat from a second heat source is advantageously applied to an external surface of the wound filament. Pressure is applied to the wound filament with the thermoplastic material in the molten state, and provides sufficient shear to cause flow of the thermoplastic material and to provide an on-line consolidation of the composite material.

DESCRIPTION OF THE DRAWING

For the purpose of illustrating useful apparatus, there is shown in the drawing a sketch of a suitable apparatus by which the process may be carried out.

DETAILED DESCRIPTION OF THE INVENTION

As indicated above, the present invention is directed to an improved process for forming a consolidated, filament wound composite from reinforcing or structural fiber, and a melt-processable, thermoplastic matrix material. The present invention beneficially provides an on-line consolidation process.

By the process of the present invention, fabrication of tubular structures useful as conduits or containers, may be achieved. In one application of the process, a high performance, light weight, filament wound pressure vessel may be produced. Well consolidated parts or structures with low void content are provided.

Typically, the thermoplastic matrix material will be characterized by a high melting point on the order of about 250° C. or more, often in the range of about 270° to 360° C.; by a high melt viscosity, at minimal shear, with shear sensitivity; and by a thixotropic molten state. Generally, the melt viscosity at minimal shear, will be on the order of about 5000 poise or more, but because of shear sensitivity, a melt-processable, thermoplastic material useful in the process, flows easily in the molten state upon the application of low or minimal pressure. By comparison, a thermoplastic having a high melting point and high melt viscosity but lacking shear sensitivity, for example PEEK, would not be a suitable thermoplastic material.

Suitable thermoplastic matrix materials for use in the process of the present invention, include liquid crystal or crystalline polymers (LCP's), in particular thermotropic LCP's. Thermotropic LCP's exist in a liquid-crystalline state above their melting point, are anisotropic in the melt phase, and are melt processable. It will be understood that other thermoplastic materials having these characteristics are likewise useful in the process of the present invention.

Thermotropic LCP's include wholly and non-wholly aromatic polyesters, aromatic-aliphatic polyesters, aromatic polyazomethenes, aromatic polyester-carbonates, and wholly aromatic and non-wholly aromatic polyesteramides. The most preferred thermotropic LCP's include wholly and non-wholly aromatic polyesters. A variety of these polymers are described in U.S. Pat. Nos. 4,540,737 and 4,799,985, which are hereby incorporated herein by reference. A specific thermotropic LCP is sold under the registered trade mark VECTRA, and the fiber form of this polymer is available commercially under the registered trade mark VECTRAN from Hoechst Celanese Corporation of Charlotte, N.C.

Reinforcing fiber, in particular, high strength, non-thermoplastic, reinforcing or structural fiber useful in the process of the present invention, may be glass such as E glass and S glass, aramid, carbon, and boron. The reinforcing fiber may be filament wound separately from a suitable thermoplastic matrix fiber, or may be filament wound after being intimately mixed or commingled with the matrix fiber into a tow. U.S. Pat. No. 4,799,985, previously incorporated herein by reference, exemplifies a structural fiber and a melt-processable, thermoplastic fiber commingled into a tow. The process of the present invention may also be applied to prepregs and tapes made from a reinforcing fiber and a thermoplastic matrix material, for instance, a pultrusion tape.

The ratio of the reinforcing fiber to the thermoplastic matrix material will depend upon the end use of the consolidated part or structure. To make a high performance pressure vessel, a high loading of the structural fiber is generally desirable, typically up to the allowable limit which may range from about 60 to 70 vol. percent of structural fiber to matrix material. But in any event, it is contemplated that the ratio will be at least about 50 vol. percent, preferably at least about 55 to 65 vol. percent, of structural fiber to matrix material.

In accordance with the process of the present invention, continuous filament, which may be in the form of a structural fiber and a melt-processable, thermoplastic fiber commingled into a tow, is wound onto a mandrel to form a multi-ply composite. During the filament winding and in accordance with the process, thermoplastic material wound onto the mandrel, is heated to a thixotropic molten state. Beneficially, to provide uniformity of melting of the thermoplastic material and avoid thermally induced strain in the consolidated structure, heat is applied to an internal surface of the wound filament, and is applied from a second heat source to an external surface of the wound filament.

Typically, for commingled fibers, the mandrel will be heated to a temperature below, but generally within about 10° to 60° C. of, the melting point of the thermoplastic material; whereas, for separate fiber laydown, the mandrel may be hotter, and typically will be at a temperature above, but close to, the melting point of the thermoplastic material. If the mandrel is too hot, gas pockets may be formed in the thermoplastic material.

The heat advantageously applied to an external surface of the wound filament, will be at a temperature substantially above the melting point. Beneficially, the externally applied heat assures fluidity of the thermoplastic material, and is directed onto the filament at the point of mandrel contact, to also provide for and enhance bonding between layers. The high melt viscosity of the molten thermoplastic material advantageously prevents dripping of the molten material from the mandrel.

In accordance with the process, pressure is applied to the external surface of the wound filament to induce shear to cause flow of the molten thermoplastic material. The applied pressure also disperses the reinforcing fibers into the molten thermoplastic matrix and levels out and breaks up fiber clusters. Beneficially, the pressure is applied at the impingement point of the filament with the mandrel. As a result of the pressure, uniformity of reinforcing fiber distribution within the molten thermoplastic matrix is provided, trapped air is removed, and consolidation is improved.

For commingled fibers including a suitable thermoplastic matrix fiber, application of low pressure is sufficient. Such a pressure will typically be on the order of about ten pounds using for example, a hand held press roll. By comparison, a flexible chain, thermoplastic material may typically require significantly more pressure, for instance on the order of about 100 psi.

In the case of separate fiber laydown, the applied pressure also pushes bundles of reinforcing fibers into the molten thermoplastic matrix. A moderate pressure on the order of about fifty pounds using the press roll, is sufficient for this purpose.

In this way, an on-line consolidation of the composite is provided by the process of the present invention. Without the external pressure, consolidation will generally be unsuccessful.

As a beneficial feature of the process, the thermoplastic material is softened by a pre-heating step prior to being wound onto the mandrel. Typically, the softening step is carried out at a temperature above, but near, the melting point of the thermoplastic material.

Pretreatment of the reinforcing fiber is also advantageous. In this respect, spreading of the reinforcing fiber into individual filaments is beneficially begun prior to the reinforcing fiber being wound onto the mandrel.

When these pretreatment steps are used, uniformity of matrix material melting and of reinforcing fiber distribution is enhanced, and a well consolidated structure with low void content, advantageously on the order of less than about 5%, is provided for. Otherwise, a composite having resin rich areas with local weakness of the resulting structure, may be produced.

As indicated, the pressure externally applied to the wound filament, when combined with the heat application, is selected to provide sufficient shear to cause flow of the molten matrix material and to achieve well consolidated structures with low void content. For sake of illustration, in the laydown of commingled fibers including a thermoplastic matrix material having a melting point of about 276° C., the mandrel may be heated to a temperature in the range of about 215°-265° C., particularly about 235°-265° C., the externally applied heat may range from about 340°-470° C., particularly from about 350°-415° C., and the heat applied in the softening step may vary from about 260°-320° C., particularly from about 285°-315° C. Under such conditions, a force on the order of about ten pounds using the hand-held press roll, will be sufficient to cause flow of the molten thermoplastic material.

It will, of course, be understood that the temperatures to be used and the pressure to be applied in a particular application of the process will depend upon factors including the melting point and melt viscosity of the melt-processable, thermoplastic matrix material, and the shear sensitivity of the material in a thixotropic molten state. Furthermore, it will be understood that uniformity of the heat and pressure application to the wound filament is important.

In an application of the process of the present invention to form a high performance pressure vessel, a melt-processable, thermoplastic fiber useful in the process, is filament wound and consolidated onto an appropriately heated mandrel using external heat and pressure sufficient to provide flow of the thixotropic molten material. The melt-processable, thermoplastic material useful in this application of the process, beneficially has gas barrier properties, maintains its physical properties over a broad temperature range, exhibits no embrittlement at cryogenic temperatures, and has a low coefficient of thermal expansion. By the term "gas barrier properties" is meant that low molecular weight gases such as hydrogen and helium, may be stored at high pressures, even near or above several thousand pounds per square inch, with virtually no leakage or solubility of the gas in the thermoplastic material. As a result, a gas barrier liner is formed prior to filament winding and consolidation of a structural overwrap.

Useful melt-processable, thermoplastic materials for forming a gas barrier liner, include LCP's, in particular thermotropic LCP's. A thermotropic LCP having the necessary gas barrier properties is sold as Vectran ® M fiber by Hoechst Celanese Corporation of Charlotte, N.C.

To provide for uniformity and consolidation of the gas barrier layer, the earlier-described, heat and pressure application may be beneficially employed. However, lower temperatures than those illustrated earlier may be sufficient due to the absence of reinforcing fiber; and it may be advantageous to permit the wound filament to solidify after it has been dressed out to form a smooth layer and prior to winding of the structural overwrap.

Thereafter, a multi-ply composite of for instance, commingled thermoplastic matrix fiber beneficially loaded with reinforcing fiber, may be filament wound and consolidated onto the mandrel to provide a structural overwrap. The thermoplastic matrix material used in the structural overwrap may be the same thermoplastic material used to provide the gas barrier layer.

A particularly suitable reinforcing fiber for a high performance pressure vessel is S2 glass. With Vectran ® M as the thermoplastic matrix material, about 55 to 58 volume percent of S2 glass fiber may be used in the structural overwrap.

If desired, an outer gas barrier layer can be filament wound over the structural overwrap by repeating the initial filament winding step. To provide strength to a consolidated structure prepared by the process of the present invention, particularly in the case of a high performance pressure vessel, alternate layers of hoop and helical patterns may be preferred; and to provide a light weight, high performance pressure vessel, the mandrel may be removed.

A suitable apparatus for carrying out the process of the present invention, is depicted in the drawing. A mandrel 10 is supported by a rod 12 having an end 14 connected to a motor (not shown) for rotating the mandrel, and having an end 16 supported by a support member. The mandrel is suitably heated by a conventional cartridge heater disposed within rod 12, which is hollow, and lead wires 18 connect the cartridge heater to a heating control device 20.

Beneficially, a pre-heating element in the form of a hot shoe 30, is located between the mandrel and a creel for the fiber, and a tensioning guide 32 for the fiber is disposed between the pre-heating element and the mandrel. A heated air tube was tested as the pre-heating element but found to be unsatisfactory as tried.

The pre-heating element is advantageously maintained at a temperature near, and typically above, the melting point of the thermoplastic material. This temperature combined with the rotation rate of the mandrel and the length of the pre-heating element, provides for softening of the thermoplastic material as it passes under tension, proximate to the heating element. The mandrel is suitably rotated at approximately 20 rpm. The pre-heating element may have a length of about 12".

Lead wires 36 connect hot shoe 30 to a heating control device 38. The hot shoe and tensioning guide 32 are movable, and during the filament winding process, traverse the face of the rotating mandrel. Softening on the hot shoe is advantageously observable as a "frost line", which is the solid/molten intercept, and the thermoplastic material may be changed from the form of a rope to a flat ribbon.

Advantageously, an upper surface 40 of the hot shoe is convex, to promote spreading of the reinforcing fiber. To provide for the spreading, the fiber beneficially makes contact with the upper surface as it passes over the hot shoe under tension. Such a convex hot shoe is conventional for drawing thermoplastic fiber to increase fiber strength.

Near the mandrel is a hot air source suitably in the form of a heated hollow tube 50 with lead wires 52 connected to a heating control device 54. Tube 50 may be a commercial air heater provided with a slit opened nozzle for providing air impingement. Tube 50 is movable and during the filament winding process, sweeps the face of the mandrel with hot air. The air stream is beneficially directed onto the filament at the point of mandrel contact. The externally applied heat is used to assure fluidity of the thermoplastic material.

The apparatus further includes an external pressure source suitably in the form of a conventional adjustable, hand-held press roll. The press roll is beneficially applied to the wound filament at the impingement point of the filament with the mandrel. The pressure externally applied to the wound filament, when combined with the heat application, is selected to cause flow of the molten thixotropic, thermoplastic material, thereby achieving well consolidated structures with low void content.

It will be understood that an alternative apparatus using for instance, a static, rather than rotating, mandrel; different means for heating the mandrel; and different means for applying external pressure may be used. Furthermore, computerized winding equipment for providing the winding pattern and angle, could be used.

In the Examples that follow and throughout this description, all procedures are carried out at ambient temperature and pressure, unless otherwise specified.

EXAMPLE 1

With reference to the drawing, mandrel 10 is heated to 245° C. and rotated at approximately 20 rpm. Hot shoe 30 of about 12" length and having a convex upper surface, is heated to 290° C. The rotation rate and length of the hot shoe provide for fiber to be on the hot shoe for about five seconds.

In a first winding step, a thermotropic LCP fiber commercially available under the trade name Vectran ® M and having a melting point of about 276° C., is wound, under tension, from a creel onto heated mandrel 10 after being softened by hot shoe 30. Hot air at a temperature of 406° C. and having a volumetric output of 0.4 cfm, is provided by heated hollow tube 50, and the air stream is directed onto the filament at the point of mandrel contact so that the wound filament is in a thixotropic molten state. A hand-held press roll is used to apply a pressure of about ten pounds at the impingement point, and the molten thermoplastic material is dressed out to form a smooth layer. Solidification of the layer is permitted prior to the next winding step. A hoop winding pattern is used.

In a second winding step, Vectran ® M fiber and S-2 glass fiber commingled into a tow are wound, under tension, from a creel onto the heated mandrel and over the first layer, after passing over the hot shoe. As a result of contact with the hot shoe, the matrix fiber is softened, and spreading of the glass fiber is begun. Hot air is again directed onto the filament at the point of mandrel contact so that the thermoplastic material is in a thixotropic molten state, and the hand-held press roll is used to apply a pressure of about ten pounds at the impingement point. Six plies of the commingled fiber are formed using a helical winding pattern and a wind angle of 65°.

Thereafter, the second winding step is repeated with the following modifications: only two plies are formed, and a hoop winding pattern is used. Afterwards, the mandrel is removed. As a result, there is formed a multi-ply structure of 1 layer of Vectran ® M (hoop), 6 plies of S-2 glass/Vectran ® M (helical, 65°), and 2 plies of S-2 glass/Vectran ® M (hoop). 58 volume percent of the reinforcing fiber is used in combination with the matrix fiber.

EXAMPLE 2

The process of Example 1 is repeated with modifications (mandrel, 220° C.; shoe, 290° C.; hot air, 0.35 cfm at 375° C.), to form a multi-ply structure of 1 layer of 3000 denier Vectran ® M (hoop); S-2 glass/Vectran ® M, alternating helix (wind angle of 65°), hoop, and helix (wind angle of 65°) plies; and 2 plies of S-2 glass/Vectran ® M (hoop).

EXAMPLE 3

The process of Example 1 is repeated with modifications (mandrel, 245°/255° C.; shoe, 260° C.; hot air, 0.35 cfm at 405° C.) to provide a multi-ply structure of 1 layer of 750 denier Vectran ® M (hoop); and S-2 glass/-Vectran ® M, alternating hoop and helix, 5 plies of hoop, 4 plies of helix.

EXAMPLE 4

The process of Example 1 is repeated with modifications (mandrel, 248°-250° C.; shoe, 270° C.; hot air, 0.3 cfm at 405° C.) to form a multi-ply structure of S-2 glass/Vectran ® M, 6500 denier/3000 denier, alternating hoop and helix, 3 plies of hoop, 2 plies of helix.

EXAMPLE 5

The process of Example 1 is repeated with modifications (mandrel, 260° C.; shoe, 310° C.; hot air, 360+ C.) to provide a well consolidated structure of 1 layer of Vectran ® M (helical, wind angle of 65°), and 6 plies of S-2 glass/Vectran ® M (helical, 65°), and 2 plies of S-2 glass/Vectran ® M (hoop). Following a conventional testing procedure for evaluating burst strength, the structure is found to burst at 2400 psi using water.

EXAMPLE 6

The process of Example 1 is repeated with modifications (mandrel, 240° C.; shoe, 290° C.; hot air, 410° C.) to form a well consolidated structure of 1 layer of 1500 denier Vectran ® M (hoop); S-2 glass/Vectran ® M, alternating helix (wind angle of 65°) and hoop, 4 plies of each; and 2 plies of the Vectran ® M (hoop). The test procedure of Example 5 is repeated, and the structure is found to leak at 2800 psi.

EXAMPLE 7

The process of Example 1 is repeated with modifications (mandrel, 224° C. for Vectran ® M, 900 denier, 245° C. for S-2 glass/Vectran ® M, 6000 denier/3000 denier; shoe, 270° C., used for S-2 glass/Vectran ® M only; hot air, 305° C. for Vectran ® M, 410° C. for S-2 glass/Vectran ® M), to provide a multi-ply structure of 1 layer of Vectran ® M (hoop); and S-2 glass/Vectran ® M, alternating hoop, helix (wind angle of 65°) and hoop. The test procedure of Example 5 is repeated, and the structure is found to leak at 500–750 psi.

EXAMPLE 8

The process of Example 1 is repeated with modifications (mandrel, 245° C., shoe, 140° C.; hot air, 405°) to form a multi-ply structure of S-2 glass/Vectran ® M having a hoop, helix, hoop, helix, hoop, hoop, helix, hoop, hoop and helix winding pattern. The test procedure of Example 5 is repeated, and the structure is found to leak at 800–1000 psi.

EXAMPLE 9

With reference to the drawing, mandrel 10 is heated to 293° C. and rotated at a suitable speed. Hot shoe 30 of about 12" length and having a convex upper surface, is heated to 280° C.

3000 denier Vectran ® M fiber is softened by being drawn from a creel over hot shoe 30 onto heated mandrel 10. One layer of the thermoplastic fiber is wound at 65°. When the wound thermoplastic material reaches a thixotropic molten state, 6000 denier S2 glass yarn is drawn over the shoe onto the heated mandrel. A hot air stream (450° C.) is directed onto the glass yarn at the point of mandrel contract. A layer of the glass yarn is wound helically at 65° and the glass yarn is pressed into the molten thermoplastic material by applying approximately 50 psi of pressure using a hand-held press-roll, to form a layer of reinforcing fiber dispersed in a thermoplastic matrix.

This procedure is repeated five times, followed by laydown of two layers of hoop wound Vectran ® M fiber. Thereafter, heat is discontinued, the multi-ply composite is allowed to cool, and the tube is removed from the mandrel. Examination of a cross-section of the tube indicates good consolidation. This procedure avoids th e cost of commingled yarns.

The process of the present invention may be carried out with other specific apparatus and with various modifications without departing from the spirit or essential attributes thereof, and accordingly, reference should be made to the appended claims, rather than to the foregoing specification as indicating the scope of the invention.

We claim:

1. A method for filament winding fiber reinforced, thermoplastic, composite components, whereby void content is reduced, the method comprising the steps of:

(a) providing a reinforcing fiber and a melt-processable, thermoplastic, matrix fiber;

(b) providing a mandrel upon which the component is formed;

(c) exerting a filament-spreading pressure on said reinforcing fiber and said matrix fiber prior to winding said fibers on to said mandrel;

(d) heating said matrix fiber to a thixotropic molten state by supplying heat to said matrix fiber from said mandrel, the temperature of said heat supplied from said mandrel ranging from about 60° Celsius below the melting point of said matrix fiber to just above the melting point of said matrix fiber, and supplying heat from a second source to said matrix fiber at an area of contact between said matrix fiber and said mandrel, the temperature of said second heat source to said area being above the melting point of the matrix fiber; and (e) applying pressure to said external surface of said wound reinforcing fiber and said matrix fiber to induce shear to cause flow of the molten thermoplastic fiber and to provide an on-line consolidation of the component.

2. The filament winding process of claim 1, further comprising softening said thermoplastic matrix material prior to winding said thermoplastic matrix material onto said mandrel.

3. The filament winding process of claim 1, wherein laydown of said reinforcing fiber and said thermoplastic matrix material onto said mandrel is simultaneous.

4. The filament winding process of claim 1, wherein laydown of said thermoplastic matrix material onto said mandrel is prior to laydown of said reinforcing fiber.

5. The filament winding process of claim 1, further comprising, prior to forming a gas barrier layer, softening said thermoplastic fiber.

6. The filament winding process of claim 1, further comprising, after laydown of said reinforcing fiber and said thermoplastic matrix material onto said mandrel, forming a gas barrier layer on said mandrel.

7. The filament winding process of claim 1, wherein said thermoplastic matrix material is a thermotropic LCP.

8. The filament winding process of claim 1, wherein said reinforcing fiber is a glass fiber.

* * * * *